(12) United States Patent
Martin et al.

(10) Patent No.: US 7,802,604 B2
(45) Date of Patent: Sep. 28, 2010

(54) DEVICE FOR THE ULTRASOUND TREATMENT OF WORKPIECES

(75) Inventors: Peter Josef Martin, Geisenheim (DE); Ulrich Vogler, Uhldingen (DE)

(73) Assignee: Tetra Laval Holdings & Finance S.A., Pully (CH)

( * ) Notice: Subject to any disclaimer, the term of this patent is extended or adjusted under 35 U.S.C. 154(b) by 379 days.

(21) Appl. No.: 12/063,691

(22) PCT Filed: Aug. 7, 2006

(86) PCT No.: PCT/EP2006/065120
§ 371 (c)(1), (2), (4) Date: Mar. 13, 2008

(87) PCT Pub. No.: WO2007/020208
PCT Pub. Date: Feb. 22, 2007

(65) Prior Publication Data
US 2010/0139867 A1  Jun. 10, 2010

(30) Foreign Application Priority Data
Aug. 13, 2005 (DE) .................. 10 2005 038 344

(51) Int. Cl.
 *B32B 37/00* (2006.01)
(52) U.S. Cl. .................. 156/580.2; 156/580.1
(58) Field of Classification Search .......... 156/73.1, 156/580.1, 580.2; 228/1.1, 110.1; 264/442–445; 310/321, 323.01, 323.18
See application file for complete search history.

(56) References Cited
U.S. PATENT DOCUMENTS

| | | |
|---|---|---|
| 3,368,085 A | 2/1968 | McMaster et al. |
| 6,605,178 B1 * | 8/2003 | Shinohara et al. ......... 156/379.6 |
| 7,344,620 B2 * | 3/2008 | Jung ....................... 156/580.2 |

* cited by examiner

Primary Examiner—James Sells
(74) Attorney, Agent, or Firm—Paul & Paul

(57) ABSTRACT

The invention relates to a sonotrode (1) for ultrasonic machining workpieces. The sonotrode (1) is connected on the input side to a drive (5) with at least two ultrasonic transmitter units excited by an ultrasonic generator, is provided with a narrow and long machining surface (12) in front on the output side of the sonotrode, and is provided, at the side, with at least slot (10) situated approximately between two ultrasonic transmitter units. In order to obtain a narrow and long machining surface (12) in front on the output side of the sonotrode (1), whereby the machining surface has a length of more than twice the effective machining length so that it extends away over the crosswise dimension even of a wider workpiece, and the height of the device, which is measured from the front machining surface to behind over the drive (5), is not significantly greater than ?/2. To this end, the invention provides that; the sonotrode (1), from its machining surface (12) toward the rear in the direction of its height (H) while leaving recesses (6) for receiving the respective drive (5), is provided as a single piece up to its rear flat surface (13) that, on the input side of the sonotrode (1) opposite the output side machining surface (12), is provided approximately parallel to the machining surface (12) and is almost as long but wider than the latter, and; the outer surface of the sonotrode (1) is closed up to the at least one slot (10) and up to the openings, which are located in the rear flat surface (13) and serve for accessing the recesses (6) for the drives (5). The overall height of the sonotrode is =?/2, with ? being equal to the wavelength of the wave oscillating in the direction of its height (H).

17 Claims, 4 Drawing Sheets

DEVICE FOR THE ULTRASOUND TREATMENT OF WORKPIECES

The invention relates to a device having a sonotrode (1) for ultrasound treatment of workpieces, wherein the input side of the sonotrode is connected to a drive unit having at least two ultrasound oscillator units stimulated by an ultrasound generator, provided forwardly at the output side of the sonotrode with a long narrow treatment surface and laterally with at least one slit located approximately between two ultrasound oscillator units. The term "sonotrode" means the body without the ultrasound oscillator unit but with recesses therefor and with a slit. On the input side, i.e. the upper or rear side depending on the orientation of the sonotrode, said body is closed by a rear flat surface with the same or a slightly shorter length as that of the treatment surface.

The invention is applicable to a number of ultrasound treatments, in particular welding, riveting and bobbing. Various attempts have been made when welding plastics materials to produce sonotrodes with ultrasound treatment or welding surfaces which are as long and narrow as possible.

A device of the type mentioned above is known from German patent DE-C1-44 39 470, which discloses a sonotrode driven by two ultrasound oscillator units to which it is connected. The ultrasound oscillator units are stimulated by an ultrasound generator. The length of said treatment surface is treasured in a first direction termed the X direction, i.e. the length of the sonotrode body. For a sonotrode with two ultrasound oscillator units, this length is about twice the length of the treatment surface, which can be oscillated by both ultrasound oscillator units on the output side with sufficient amplitude for uniform treatment, for example welding. If the length of the treatment surface for a single ultrasound oscillator unit is described as the "effective treatment length", then for the known sonotrode with two ultrasound oscillator units, said length is equal to twice the "effective treatment length". The known sonotrode has no recesses for the ultrasound oscillator units. Further, the ultrasound oscillator units in the known case are arranged rearwardly on the rear flat surface. Thus, in the Y direction, i.e. perpendicular to the length of the sonotrode, this produces a considerable height, frequently greater than the available workspace.

For many applications, the workpiece is arranged between the sonotrode and a counter-tool and then welding is carried out, by oscillating the sonotrode and pressing it to the workpiece to transfer the welding energy. Frequently, long weld lines have to be produced, not always satisfactorily. In the central region of a weld surface, known sonotrodes can overweld and produce spot burns, while at the edge regions, at the ends of the welded surfaces, large sonotrodes cannot be stimulated and so the weld line is defective in that location. Attempts have thus been made to produce adaptations to allow large workpieces to be welded. Instead of lining up oscillatable sonotrodes with corresponding drive units, sonotrodes have been provided with a longer weld surface and very good welds have been obtained by connecting them with two (or more) ultrasound oscillator units. By connecting two ultrasound oscillator units to a single ultrasound generator, the ultrasound units oscillate at the same frequency and stimulate the sonotrode evenly.

While the known device is satisfactory for many applications, using it with filling and packing machines with a high throughput entails reconsideration. With high performance machines in the packaging industry, no large ultrasound treatment devices can be used as the available workspace is tight, in particular as regards the height of the device from its front treatment surface to the rear end of the drive unit. This is combined with a requirement for low masses to make the ultrasound devices easier to accelerate. The height of the known device for ultrasound treatment is, however, of the order of one wavelength and cannot be smaller without taking particular steps.

European patent EP-B1-0 615 907 discloses sealing devices in machines for filling and sealing packages having reaction bodies, with which a uniform seal can be produced over the length of the treatment surface. The length of the treatment surface is not sufficient, however, and the difficulties encountered when using several ultrasound sealing devices and the resulting non-uniform seal was recognized.

Further, International patent WO-A-99/48759 attempted to develop an ultrasound sealing device with a long sonotrode having slits, for a tilling machine to laterally seal tilled tubular packaging material. The height of that sealing device, however, is too great for current high performance filling machines in the packaging industry and thus it could not be used. Moreover, the drive units must be encapsulated by a housing, resulting in it also being too heavy as well being unacceptably tall.

Thus, the invention aims to overcome the problems of the prior art described above to produce a long narrow treatment surface at the front of the sonotrode to produce a treatment surface which is more than twice as long as the effective treatment length defined above, so that it can thereby also accommodate a wider workpiece, to produce an essentially uniform treatment at the treatment surface and wherein the height of the device, measured from the front treatment surface to the rear beyond the drive unit, is essentially no greater than $\lambda/2$, the half wavelength of the ultrasound oscillation produced.

The invention accomplishes this aim by ensuring that the sonotrode is unitary, excluding recesses to accommodate the appropriate drive unit, from its front, long narrow treatment surface rearwardly in the direction of its height to its rearward flat surface which, on the input side of the sonotrode opposite to the treatment surface on the output side, is approximately parallel to the treatment surface, is of almost the same length, but is wider than it, and in that the outer surface of the sonotrode is closed, apart from said at least one slit and apart from openings in the rear flat surface for access to the recesses for the drive unit, whereby the total height of the sonotrode is $\leq \lambda/2$ wherein $\lambda$=the wavelength of the wave oscillating in the Y direction.

The ultrasound generator transforms ains tension into high frequency electrical energy. Each ultrasound oscillator unit stimulated thereby has a converter, for example a piezoelectric element, and an amplitude transformation part or booster. On the output side, a sonotrode is arranged on said ultrasound oscillator unit. The high frequency electrical energy is transformed into mechanical oscillations by the converter. The amplitude of the mechanical oscillations in the Y direction are transformed by the booster structure and are then fed to the sonotrode. Finally, this oscillational energy is fed into the weld line to produce the desired ultrasound treatment of the workpiece.

The novelty of the invention lies in the particular organization of the sonotrode and its control. Like a known sonotrode, the sonotrode of the invention also has a long narrow treatment surface on the output side and on the input side it is closed rearwardly in the Y direction by a rear surface which is flat in the ease of the invention. An important additional feature is the fact that the sonotrode is unitary in construction from its front treatment surface to said rearward flat surface. Finally, recesses are provided for the drive units for the sonotrode. In this regard, hollows are formed in the unitary sonotrode. The drive unit can be inserted into every recess and be fixed therein, for example using a stud.

Said rear flat surface runs substantially parallel to the front treatment surface and is almost as long. The rear flat surface on the energy input side of the sonotrode is located on the side of the sonotrode body that is opposite to the treatment surface located on the output side.

In accordance with the teaching; of the invention, the outer surface of the sonotrode is essentially closed, producing a sonotrode body which is more compact, readily fixed and easier to clean. The outer surface of the sonotrode is not 100% closed. Firstly, a slit is provided, as in known sonotrodes, which may completely pass through the sonotrode from one side to the other. This slit can also have different forms; it may, for example, be interrupted or formed from several slit portions. In each case, the outer surface is interrupted in the region of said at least one slit. In addition, the outer surface is interrupted by said openings, and thus is also not closed in the region of the openings. However, the fact that the outer surface is completely dosed apart from the slit and the openings is a novel feature.

The openings may have different forms and provide access to the recesses to allow the drive unit to be placed in the recesses. In preferred embodiments, the drive unit is completely surrounded by the outer surface of the sonotrode with the exception of said opening.

This organization of the sonotrode with a unitary construction and a closed outer surface has a major advantage in that an extra housing is not required for the sonotrode and its drive units. Thus, the advantage arises that the total construction in the Y direction, i.e. perpendicular to the treatment surface, which is flat, for example, is lower so that its mass is smaller and the whole tool can also be produced more cheaply as only one precision part has to be produced, namely the sonotrode; no extra housing is necessary, as is the case with known devices of comparable type.

Thus, in accordance with the further feature of the invention, the total height of the sonotrode is less than or equal to $\lambda/2$, $\lambda$ being the wavelength of the oscillation oscillating in the Y direction, i.e. in the height direction of the sonotrode.

If this novel device is installed for welding workpieces containing plastic, for example in the packaging industry, then the invention even allows packaging produced from a tube of packaging material to be laterally sealed in a tilling machine. In other words, the long narrow treatment surface of the novel sonotrode can accommodate the lateral extent of the packaging tube. The features of the invention can produce a substantially uniform oscillation amplitude that extends over the length of the treatment surface. Further, it is possible to provide a device that is small enough and light enough to install in a high performance filling machine.

A further important advantage of the invention is that in machines for packaging fluid foodstuffs, such as milk or fruit juice, the whole sonotrode can be properly cleaned without damaging the drive units. The hygienic construction of the machine parts is very important to the user of such a machine.

The device of the invention can be constructed with two drive units to produce even weld control over the whole treatment length on the output side, with the result that the weld line produced with this device is of high quality. Sonotrodes with only two drive units popular for use in packaging produced from a tube of packaging material based on paper, when the packaging volume is less than 0.75 liters, for example. The mechanical construction of such a sonotrode is particularly rigid and stable, and a high load can readily be input. This is a further advantage of the closed outer wall of the novel sonotrode, as the load is fed into the sonotrode. In known machines, the input load is taken up by the sonotrode rather than the housing.

The device of the invention can, however, also be supplied with one sonotrode with three drive units. This allows packaging of the type mentioned above to be produced with a volume of 0.75 liters, 1 liter and also 1.5 liters.

A further advantage of the invention lies in the fact that sonotrodes with three or more drive units can be stimulated by just one ultrasound generator. A sonotrode with three drive units has the further advantage that against the counter tool, i.e. the anvil, the applied load must always be symmetrical to avoid lateral tilting of the tool. Further, the welded seam is uniform over the whole treatment length, as the single ultrasound generator produces a single frequency and thus a uniform treatment quality over the entire treatment width and length.

A further advantageous feature of the invention lies in the fact that the recess to accommodate the drive unit in the rearward flat surface has a circular opening with a ring surface extending in the Y direction, i.e. perpendicular to the rear flat surface and in that for sealing, a cover having at least one circular projection which matches the circular opening can be attached, wherein the projection has an attaching ring surface which also extends in the Y direction, i.e. perpendicular to the rear flat surface of the sonotrode, onto which an O-ring can be fixed. There are many applications for which the device of the invention is used under clean room conditions or at least is used without fluid. In other applications, however, the sonotrode has to be used in a wet room, so that the high tension part of the drive unit must be protected against ingress of moisture. For this reason, the features defined above are advantageously supplemented by a cover which can be placed on the sonotrode from the back and which can seal the recesses from the wet room. Even if the recess, which is within the sonotrode body, is polygonal in cross section in order to accommodate the drive unit practically and completely, it is advantageous to make the opening in the rear flat surface of the sonotrode circular in shape, since the means for sealing the recess against the space outside the sonotrode body is easier to produce thereby. Thus, advantageously, the circular opening on the input end of the recess has a circular ring surface because it can be sealed correctly with an O ring and can be manufactured in a precise manner. The ring surface advantageously extends perpendicular to the rear flat surface, i.e. in said Y direction. When in a preferred embodiment the cover also has a circular projection per recess (i.e. for example three projections for three recesses), then they can be inserted in the circular opening so that said ring surface lies opposite to an attaching ring surface. Finally, an O ring can be applied to ensure a secure seal between the two ring surfaces. Both manufacture and assembly are practical and easy in the preferred embodiment with three recesses and a corresponding cover with three projections.

In a further advantageous embodiment, in accordance with the invention the number N of drive units coupled to the sonotrode is equal to N+1, in which N is an even number. This ensures that the drive units are always arranged symmetrically with respect to the central axis, and consequently the load is always symmetrically supplied even when high loads are used, the treatment surface cannot tilt onto a workpiece or the anvil. Preferably, the cover is produced from aluminium or stainless steel.

According to the invention, it is also advantageous, when the sonotrode has three drive units in a row in the X direction at the same distance (D) from each other and which are stimulated by just one ultrasound generator, for the effective treatment length B to be ≧158 mm and for the height H of the sonotrode in the Y direction to be approximately that of the slit length+I+10 mm. This special and preferred embodiment of the device of the invention provides the user with a sonotrode that is closed on all sides excluding the slits and recesses or circular openings. A housing is not necessary, and the sonotrode consists of a compact integral body which almost completely encloses the drive units of the sonotrode. The device of the invention with the latter features is derived from a special specification of a particularly advantageous embodiment and with the features described here has produced high quality treatments. The effective treatment length B is also the effective weld length if the treatment carried out by the sonotrode is welding. The height H of the sonotrode in the Y direction, i.e. perpendicular to the rear flat surface of the sonotrode, is only about 10 mm larger than the length I of the slit. The slit is essentially responsible for interrupting transverse oscillations (in contrast to the longitudinal oscillations vibrating in the Y direction).

A particularly advantage is derived from the further embodiment of the invention wherein the output end region of the sonotrode is extended by a length C of <7 mm by forming a toot on each side of the sonotrode. It has been discovered that producing a foot extending in the X direction by more than 7 mm is not effective, but in contrast, the foot can advantageously cover critical regions of the treatment surface, so that the treatment can also be effective if the amplitude is attenuated in the more remote regions. The foot appears to push the amplitude attenuation in the end region outwards. With the packaging machines described above, the paper tube, particularly in high performance machines, moves over the treatment surface and the anvil at a very high speed and at this speed may drift laterally by a few millimeters. The feet at the outer end regions can, for example, ensure that a continuous weld line can be produced which is also of high quality at the end regions.

A further advantageous feature of the invention provides that the distance J of the rear upper end of the slit from the rear flat surface is <20 mm, preferably in the range 3 mm to 8 mm. This distance, which defines the start of the slit at the input side of the sonotrode, substantially influences the deflecting oscillation at the piezo element.

When in a further embodiment of the invention the slit length I is in the range 0.6×H to 0.9×H, it should be noted that this length must constitute an essential portion of the oscillation amplitude. As already mentioned, the slits may even be interrupted if these proportions are complied with.

The deflecting oscillation and also the amplitude distribution are essentially influenced by the distance G of the slits from each other in the X direction, which is about ⅓ of the length A of the sonotrode on the input side. A reasonable range for the slit separation in this particular embodiment of the device of the invention is 5 mm to 30 mm.

The deflecting oscillation and the amplitude distribution are also influenced by the centre-to-centre distance D of the drive units from each other in the X direction, which is about ⅓ of the length A of the sonotrode on the input side.

If L designates the depth of the drive unit in the sonotrode body and if said depth L of that drive unit is in the range H/3 to H/2, then several parameters can be positively influenced, for example the deflecting oscillation of the piezo element, the transformation of the whole sonotrode and the amplitude distribution. An optimum value for the depth L is about H/2.5.

Further the height M of the reflector of the drive unit, if it is in the range 10 mm to 22 can influence the amplitude transformation. If this height is increased, for example, then amplitude transformation is increased. Particularly advantageously, the height of the reflector in the piezo element is 16 mm.

Other particularly advantageous embodiments and features of the invention are defined in the other dependent claims. In particular, it should be noted that both the radius R of the transitional region between the wide end of the side edge of the sonotrode to the output end and also the height P of the broad rear section of the sonotrode from the side edge of the rear flat surface to the starting point of the radius R influence the frequency and transformation. Regarding the transitional radius, special tests have shown that an optimum value for the radius is about 25 mm.

With the particular embodiment described here, which will be described in more detail below with reference to the drawings, the width of the sonotrode on the output side, i.e. the effective weld width, is about 9 mm. Depending on the treatment, i.e. welding, cutting or riveting, the treatment surface can also be other than flat, i.e. it may be outwardly convexly curved in cross section or it may be inwardly concavely curved or pointed, or the like. If the sonotrode is to be used exclusively for cutting, the width of the treatment surface is then set at 0.1 mm, for example.

The width of the sonotrode at the output side is important for the translation ratio of the width E on the input side to the width F on the output side. In the special case of the device of the invention, for example, the width E of the sonotrode at the input side may be 35 mm. Good results are also obtained when F is between 20 mm and 80 mm, however.

Said ratio E/F is determined by the amplitude which is required for treatment, for example welding. It has been shown that for polyethylene, the amplitude has to be at least 20μ, for example.

In a further embodiment, the sonotrode of the invention is produced from titanium. Successful tests were also carried out with a sonotrode wherein the recess to accommodate the drive unit exhibited insulating material, preferably an insulating coating or an insulating insert, because the piezo element could then be protected and arcing can be avoided. In the prior art, when a device of the type of the invention had to operate in wet surroundings, a housing was provided. In accordance with the invention, this can be avoided by means of the unitary sonotrode with the enclosed drive units and with a cover in the rear region. While in dry surroundings a screen would be sufficient, for many applications in packaging machines in wet surroundings the piezo element is encapsulated; in particular it is tightly closed by said cover. Then, advantageously, a plate can be provided on the inner side of the cover, simplifying mounting on the sonotrode. Cabling is via the plate. Advantageously, this results in a smaller volume as discharging resistors can be attached to the plate. The cables are shorter and the cooling space is larger.

Further features, advantages and applications of the present invention will become apparent from the following description of preferred embodiments made with reference to the accompanying drawings, in which.

Figure 1:
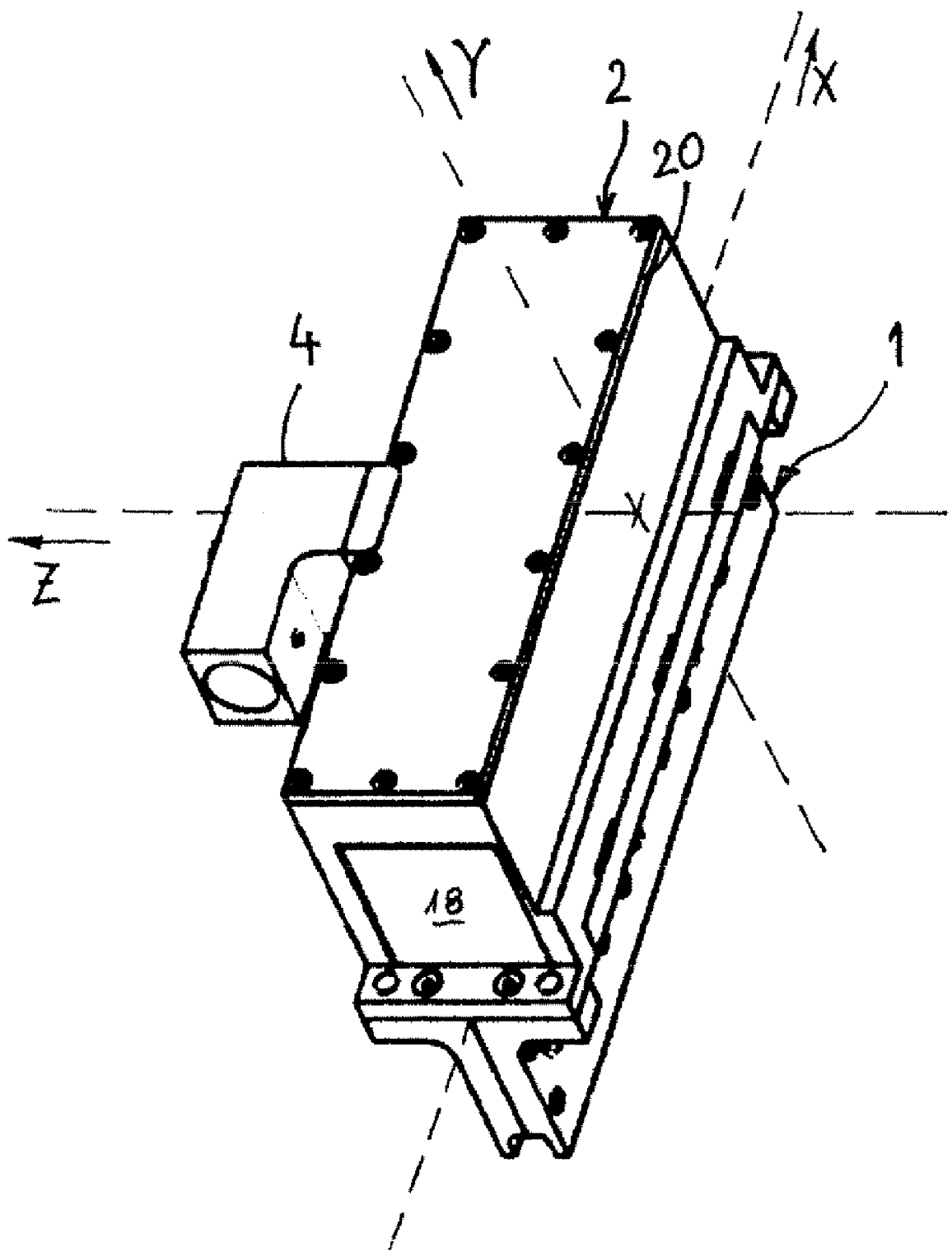
FIG. 1 is a perspective view of an encapsulated embodiment of a sonotrode with three drive units.

The first embodiment shown in FIGS. 1 to 5 of the device of the invention shows the sonotrode generally designated 1 which is closed by a cover 2 at the rear near the rear input side of the sonotrode 1. The cover is not present in the embodiment shown in FIGS. 6 and 7, which shows an embodiment having feet 3. The ultrasound generator is not shown, but the lateral (Z direction) cable housing 4 is shown, and the drive unit of the sonotrode 1 is designated in FIGS. 3 to 7 with general reference numeral 5. Each of the three drive units 5 is in a recess 6 which is shown with a circular cross section in this embodiment.

The embodiments of the sonotrode 1 shown here have three drive units 5, which are all stimulated by a single ultrasound generator, not shown. Further, each ultrasound oscillation unit of the drive unit 5 has a piezo element 7 with its own reflector 8. This drive unit 5 is fixed in the recess 6 of the sonotrode 1, by means of a fixing bolt 9

Between two ultrasound oscillation units or drive units 5 is a slit 10 which passes completely through the sonotrode 1; it follows that for the three drive units 5, two slits 10 are provided. S-shaped hooks 11 for fixing the sonotrode 1 securely to a machine frame, not shown, are located on the side surfaces of the sonotrode 1, best seen in the sectional views of FIGS. 5 and 7. For easy secure fixing, said hooks 11 are welded to the outside of the sonotrode or, alternatively, they may be unitarily formed with the sonotrode body.

Figure 6:
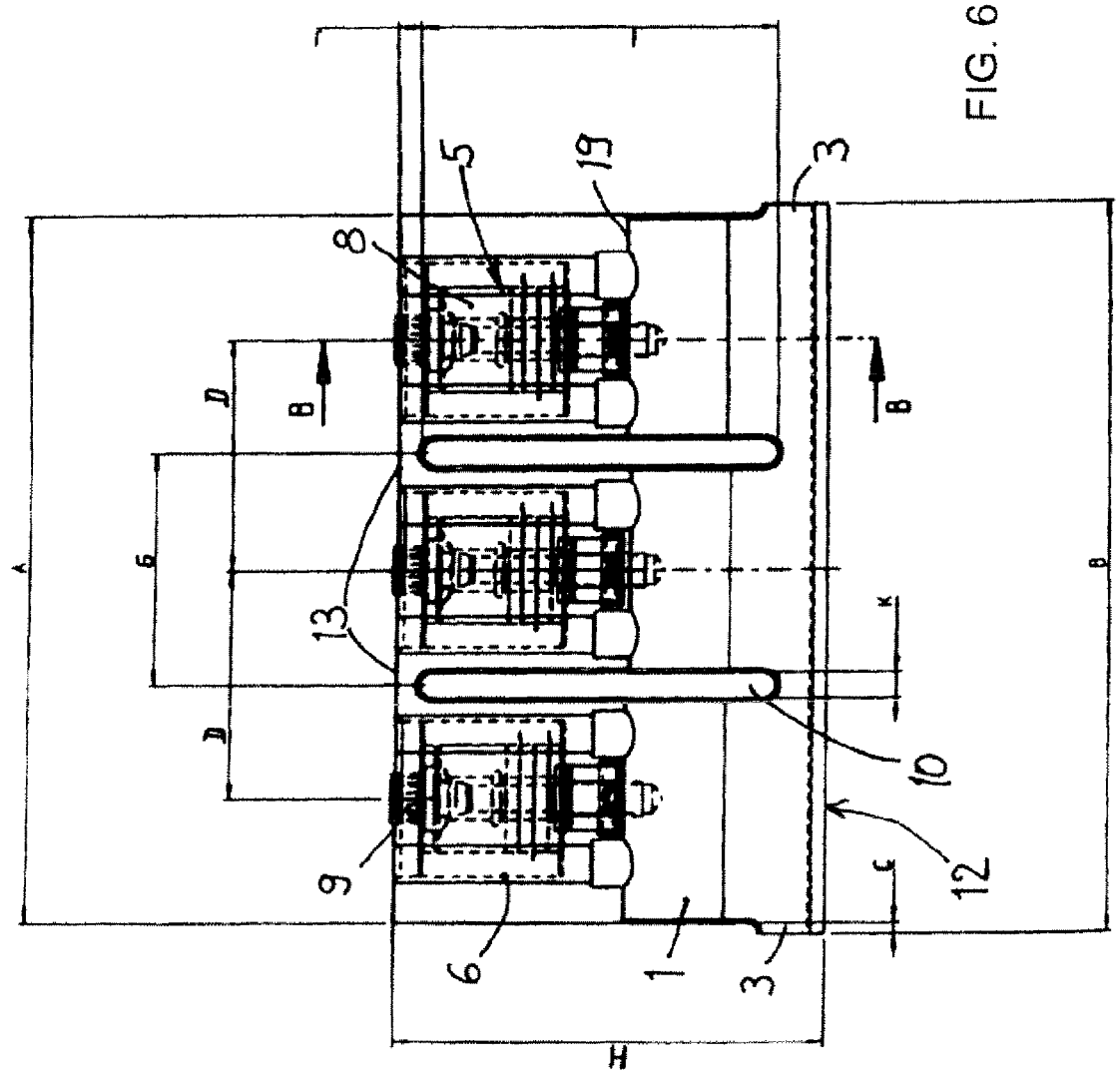
FIG. 6 is an enlarged view compared with FIG. 4 of a further embodiment of a sonotrode without a cover and with feet.

At the output side of the sonotrode 1, which is lowermost when viewed in the Y direction, the sonotrode is provided with a long narrow treatment surface 12. On the input side, i.e. uppermost in the Y direction and rearwardly depending on the orientation of the sonotrode, its body is closed by a rear flat surface 13 which, seen in the X direction, is about the same length as the treatment surface 12. In FIG. 6, this length of the rear flat surface 13 is shown as A and that of the treatment surface 12 is shown as B; the length of the latter is the length A extended by the extent of each foot in the X direction (in the longitudinal direction of the sonotrode 1).

The whole body of the sonotrode 1 has the height shown in FIG. 6, while the length of the slit 10 is designated 1 and the distance of the rear upper end of the slit 10 from the rear flat surface 13 is given the reference J.

Further lengths, breadths etc are shown in the accompanying list of references.

Figure 3:
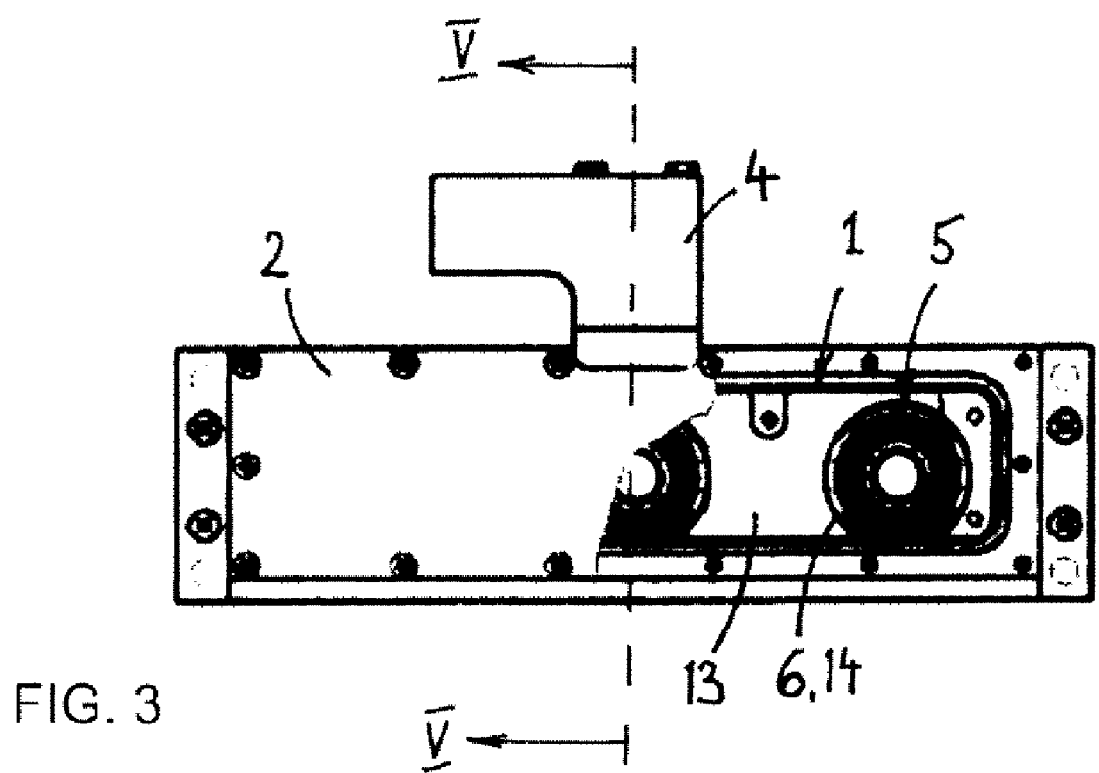
FIG. 3 is a top view of the sonotrode of FIG. 1 with a cover, the cover being partially broken away to show the drive unit.

FIG. 3 in particular shows that the rear flat surface is provided with circular openings 14 for access to the recesses 6 for the drive unit 5. Each recess 6 has a ring surface 15 next to the circular opening 14 perpendicular to the rear flat surface 13, i.e. extending in the Y direction, to produce a seal which is provided by the cover 2. This ring surface 15 extends around the opening 14.

When the sonotrode of FIGS. 1 to 5 is to be used in a wet space, the high tension part, i.e. the drive unit 5 for the sonotrode 1, must be sealed from the exterior, especially the drive unit 5 to the top opening 14 nested in the rear recess 6 of the sonotrode 1 and thus completely surrounded by the sonotrode body.

In the embodiment shown here, the side of the cover 2 in the L direction (FIG. 1) has an angular cable supply housing 4 and internally, the cover 2, which extends over all three drive units 5, has circular projections 16. The diameter of the projections 16 matches that of the circular opening 14 of the recess 6 and can be inserted into this opening, wherein said attaching ring surface 17 on projection 16 lies parallel to said ring surface 15. An O ring, not shown in the figures, can be disposed between these two ring surfaces 15, 17. This produces a good seal of the high tension part of the drive unit 5 against the external wet space.

Figure 2:
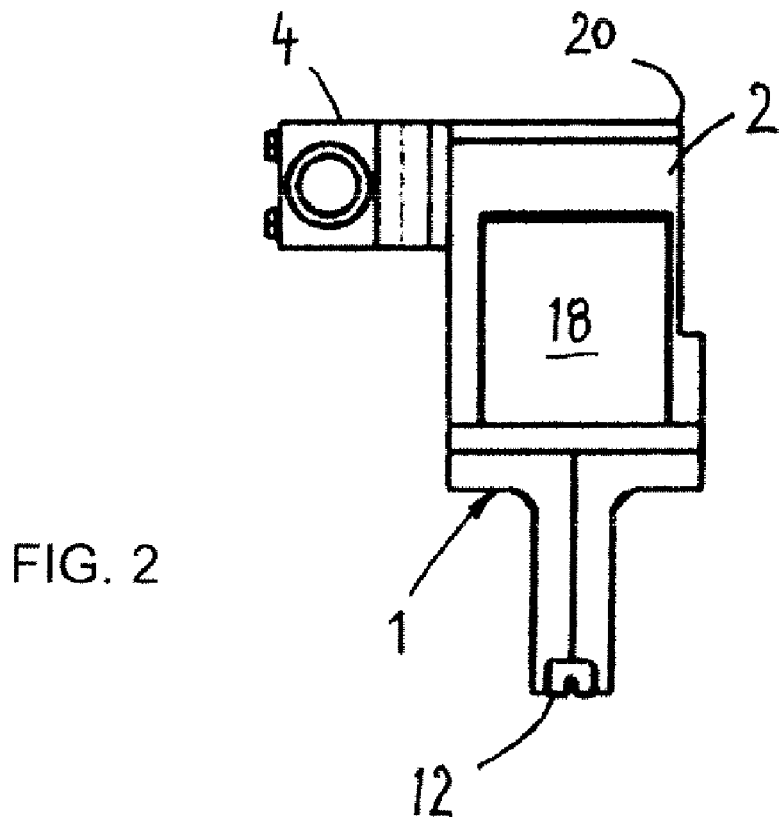
FIG. 2 is a side view of the sonotrode viewed in FIG. 1 from bottom to top.
Figure 4:
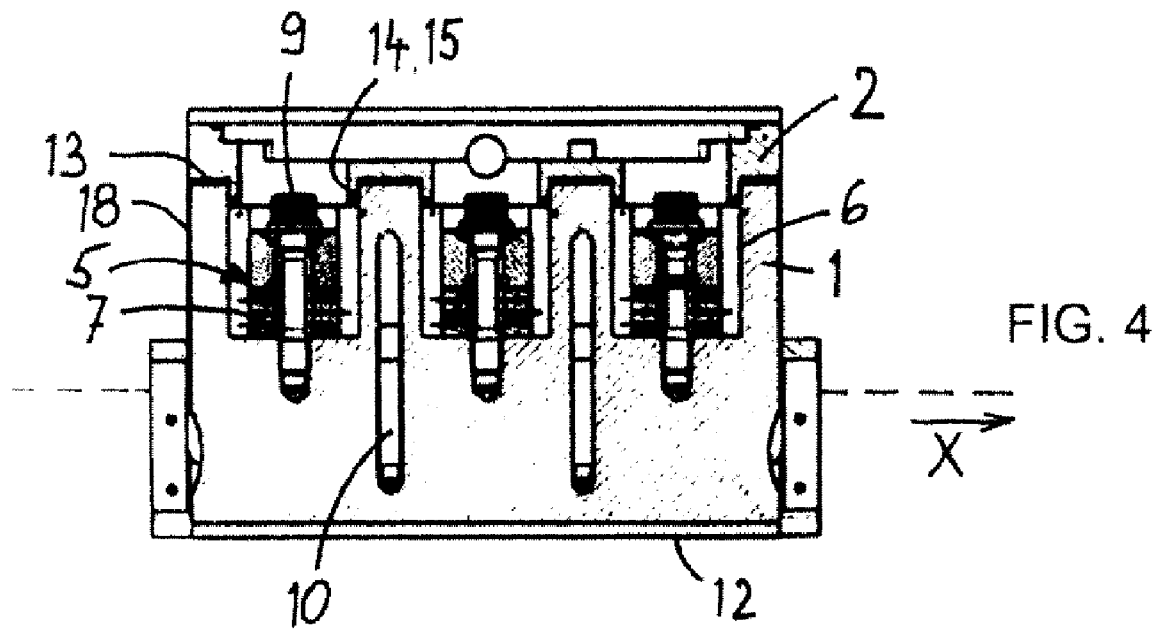
FIG. 4 is a cross sectional view of the sonotrode of FIGS. 1 to 3, wherein the axis of the sonotrode in the X direction lies in the plane of the figure.

The sonotrode 1 filled with the drive units 5 has two side faces which are not described in detail here and perpendicular thereto has two sides the front left of which is shown as reference number 18 in FIGS. 1 and 2. To form a seal, the cover 2 can be box-shaped and can be fixed to the machine frame so that the sonotrode 1 can be inserted into the box-shaped cover in the Y direction and fixed thereto. This produces the form shown in FIGS. 1 to 3.

Figure 5:
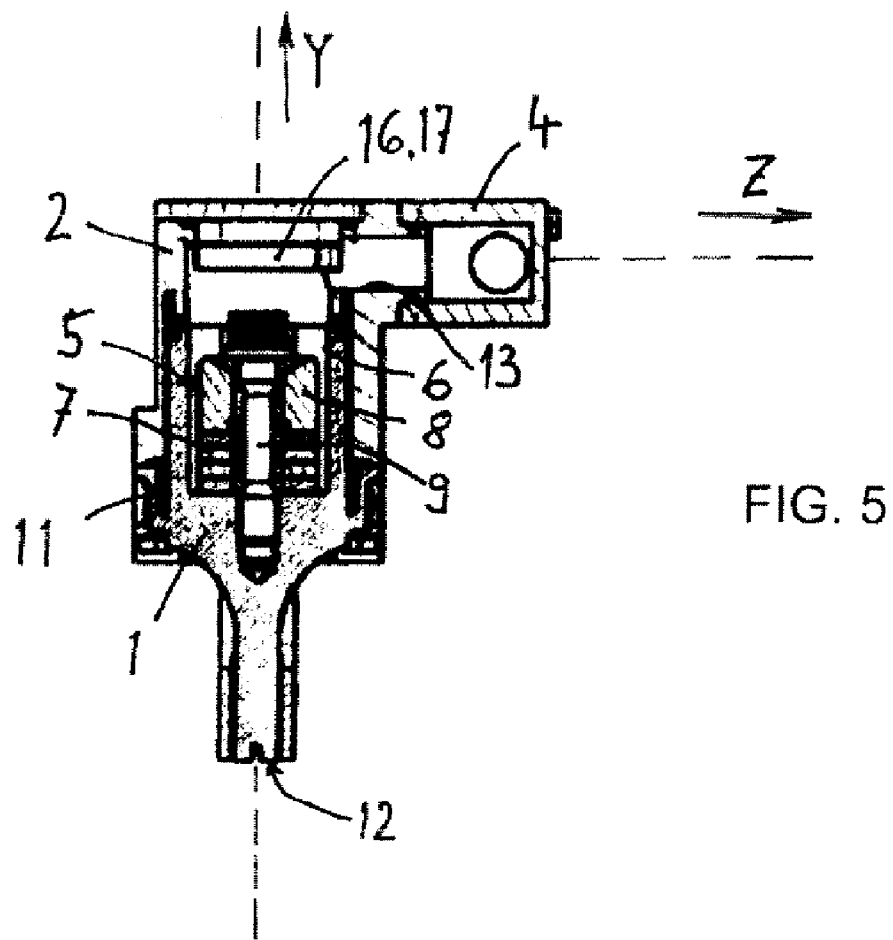
FIG. 5 is a cross sectional view along the line V-V of FIG. 3.
Figure 7:
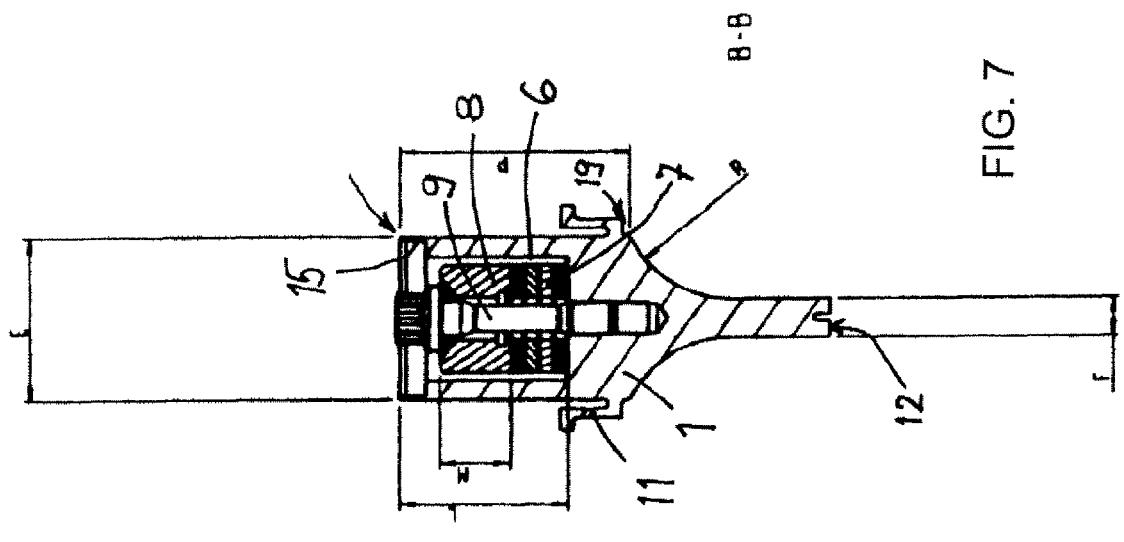
FIG. 7 is a cross sectional view of the sonotrode of FIG. 6 along the line B-B.

The drawings show that the radius R in the embodiments of FIGS. 1 to 3 is smaller than in the embodiments of FIGS. 5 to 7. This radius R is measured from the wide edge 19 to the output end on the treatment surface 12.

LIST OF REFERENCE NUMERALS

1 Sonotrode
2 Sonotrode cover
3 Foot
4 Cable supply housing
5 Drive unit for sonotrode
6 Recess
7 Piezo element
8 Reflector
9 Fixing bolt
10 Slit
11 S-shaped hook
12 Treatment surface
13 Rear flat surface
14 Opening
15 Ring surface around opening 14
16 Projection on inside of cover 2
17 Attaching ring surface
18 Side face
19 Wide edge
20 Side
A Length of sonotrode on input side
B Length of sonotrode on output side
C Length/extent of foot in X direction
D Centre-to-centre separation of piezo elements
E Width of sonotrode 1 on input side
F Width of treatment surface on output side
G Separation of slits
H Height of sonotrode
I Length of slit 11
J Distance of rear upper end of slit from rear flat surface 14
K Width of slit
L Depth of drive unit 5
M Height of reflector 8 in piezo element
R Radius from wide edge 19 to output end on treatment surface
P Height of wide rear section of sonotrode 1 from side edge 20 of rear flat surface 13 forwardly to the wide edge 19

The invention claimed is:

1. A device having a sonotrode (1) for ultrasound treatment of workpieces, wherein the input side of the sonotrode (1) is connected to a drive unit (5) having at least two ultrasound oscillator units stimulated by an ultrasound generator, provided forwardly at the output side of the sonotrode with a long narrow treatment surface extending in an X-direction (12) and laterally with at least one slit (10) located approximately between two ultrasound oscillator units;

characterized in that the sonotrode (1) is unitary, excluding recesses (6) to accommodate the appropriate drive unit (5), from its treatment surface (12) rearwardly in the direction (Y) of its height (H) to its rearward flat surface (13) which, on the input side of the sonotrode (1) opposite to the treatment surface (12) on the output side, is approximately parallel to the treatment surface (12), has almost the same length thereas, but is wider than the latter, and in that the outer surface of the sonotrode (1) is closed, apart from said at least one slit (10) and apart from openings (14) in the rearward flat surface (13) providing access to the recesses (6) for the drive unit (5), whereby the total height of the sonotrode is $\leq \lambda/2$ wherein $\lambda$=the wavelength of the wave oscillating in the Y direction.

2. A device according to claim 1, characterized in that the recess (6) to accommodate the drive unit (5) in the rear flat surface (13) has a circular opening (14) with a ring surface (15) extending in the Y direction, i.e. perpendicular to the rear flat surface (13) and in that for sealing, a cover (2) having at least one circular projection (16) which matches the circular opening (14) can be attached, wherein the projection (16) has an attaching ring surface (17) which also extends in the Y direction, i.e. perpendicular to the rear flat surface (13) of the sonotrode (1), onto which an O-ring can be applied.

3. A device according to claim 1 or claim 2, characterized in that the number N of the drive units (5) coupled to the sonotrode (1) is N+1 in which N is an even number.

4. A device according to one of claims 1 to 2, characterized in that in the X direction the sonotrode (1) has three (N=3) drive units (5) in a row at the same distance (D) from each other, which are stimulated by only one ultrasound generator, in that the effective treatment length (B) is $\geq$158 mm and in that the height (H) of the sonotrode (1) in the Y direction is approximately equal to the slit length (I) plus 10 mm.

5. A device according to claim 4, characterized in that the end region of the sonotrode (1) on the output side is extended by an extension (C) each of <7 mm by means of a foot (3) on each side (18) of the sonotrode (1).

6. A device according to claim 4, characterized in that the distance (J) of the rear upper end of the slit (10) from the rear flat surface (13) is <20 mm and preferably in the range 3 to 8 mm.

7. A device according to claim 4, characterized in that the slit length (I) is in the range 0.6×(H) to 0.9×(H).

8. A device according to claim 4, characterized in that the distance (G) separating the slits (10) from each other in the X direction is approximately ⅓ of the length (A) of the sonotrode (1) on the input side.

9. A device according to claim 4, characterized in that the centre-to-centre separation (D) of the drive units (5) from each other in the X direction is about ⅓ of the length (A) of the sonotrode (1) on the input side.

10. A device according to claim 4, characterized in that the positioning depth (L) of the drive unit (5) from each other in the X direction is in the range H/3 to H/2.

11. A device according to claim 4, characterized in that the height (M) of the reflector (8) in the drive unit (5) is in the range 10 mm to 22 mm.

12. A device according to claim 2, characterized in that the slit width (K) is in the range 4 mm to 14 mm.

13. A device according to claim 3, characterized in that the radius (R) from the edge (19) of the sonotrode (1) to the end on the output side is in the range 15 mm to 40 mm.

14. A device according to claim 4, characterized in that the height (H) of the sonotrode (1) in the Y direction is in the range 70 mm to 130 mm, preferably less than 100.

15. A device according to claim 4, characterized in that the width of the sonotrode (E) on the input side is in the range 20 mm to 80 mm, preferably about 35 mm.

16. A device according to claim 4, characterized in that the width (F) of the treatment surface (12) on the output side of the sonotrode is <30 mm, preferably in the range 5 mm to 30 mm, more preferably 9 mm.

17. A device according to claim 4, characterized in that the height (P) of the wide rear section of the sonotrode (1) from the side (20) of the rear flat surface (13) forwardly to the starting point of the radius (R) is in the range (H/2−15 mm) to (H/2+15 mm).

* * * * *

UNITED STATES PATENT AND TRADEMARK OFFICE
CERTIFICATE OF CORRECTION

PATENT NO. : 7,802,604 B2  Page 1 of 1
APPLICATION NO. : 12/063691
DATED : September 28, 2010
INVENTOR(S) : Peter Josef Martin et al.

It is certified that error appears in the above-identified patent and that said Letters Patent is hereby corrected as shown below:

Column 1 Line 18, delete "bobbing" insert -- hopping --

Column 2 Line 15, delete "tilling" insert -- filling --

Column 2 Line 15, delete "tilled" insert -- filled --

Column 2 Line 44, delete "≦" insert -- ≤ --

Column 2 Line 63, delete "ease" insert -- case --

Column 3 Line 45, delete "tilling" insert -- filling --

Column 5 Line 1, delete "≧" insert -- ≥ --

Column 5 Line 23, delete "toot" insert -- foot --

Column 5 Line 66, after "22" insert -- mm --

Column 9 Line 15, delete "≦" insert -- ≤ --

Column 9 Line 35, delete "≧" insert -- ≥ --

Signed and Sealed this

Twenty-first Day of December, 2010

David J. Kappos
*Director of the United States Patent and Trademark Office*